United States Patent Office 3,365,500
Patented Jan. 23, 1968

3,365,500
HYDROXYBENZALDEHYDE PROCESS
Donald F. Pontz, Midland, Mich., assignor to The Dow Chemical Company, Midland, Mich., a corporation of Delaware
No Drawing. Filed Jan. 21, 1964, Ser. No. 339,104
5 Claims. (Cl. 260—600)

ABSTRACT OF THE DISCLOSURE

In the Reimer-Tiemann reaction wherein phenol is reacted with chloroform and an alkali metal base to make salicylaldehyde and p-hydroxybenzaldehyde, improved yields of total aldehydes and decreased tar formation are obtained when the reaction medium is aqueous methanol of 10–75 percent by weight concentration as compared to reactions run in water alone or in aqueous ethanol. The improvement in total aldehyde yield is due principally to increased production of the para isomer. Preferably, 2–4 moles of phenol and 3–8 moles of sodium hydroxide are reacted with a mole of chloroform.

---

The present invention relates to an improved process for making salicylaldehyde and p-hydroxybenzaldehyde whereby there are obtained increased yields of products, decreased production of waste material, and easier separation of the desired products from the reaction mixture.

The usual method employed for making salicylaldehyde and p-hydroxybenzaldehyde on a commercial scale is the Reimer-Tiemann reaction where phenol and chloroform are reacted with aqueous alkali at about 25–70° C. Although this reaction has been intensively investigated over the many years since its discovery, it has never been found possible to increase the yield of hydroxyaldehydes above about 50–60% of the theoretical. The hydroxyaldehydes produced consist of about 5 parts of salicylaldehyde to one part of p-hydroxybenzaldehyde, and the remainder of the reaction product is tar.

Various expedients have been tried in efforts to improve these results, for example, other solvents or mixtures of solvents to serve as reaction media. Aqueous ethyl alcohol has been used successfully to facilitate the use as starting materials in the Reimer-Tiemann reaction of such insoluble phenols as nitrophenol and naphthol. Statements applying to the use of ethyl alcohol or aqueous ethyl alcohol as a solvent for the reaction of phenol itself are vague and somewhat contradictory. Traub, German Patent 80,195 discloses the use of 95% ethyl alcohol as reaction solvent for the production of hydroxyaldehydes, particularly vanillin, by the Reimer-Tiemann reaction and claims improved yields, lessened tar formation, and increased production of the para-hydroxy isomer at the expense of the ortho-hydroxy compound as results of this mode of operation. No actual experimental results are given. However, at the end of the text of this patent as reproduced in Friedlander's Fortschritte der Teerfarbenfabrikation, vol. 4, p. 1289 (1894–7), there appears the disparaging comment that the yield of hydroxyaldehydes from Traub's process is very unsatisfactory and is scarcely better than that from the original process.

Sen et al., J. Indian Chem. Soc., 9, 173 (1932) state that the use of chloroform as an ethyl alcohol solution in the Reimer-Tiemann reaction increases the yield of aldehyde. However, the only example describing the reaction of phenol with chloroform and sodium hydroxide in aqueous ethyl alcohol shows a combined yield for salicylaldehyde and p-hydroxybenzaldehyde of only 33% based on the phenol reacted. The proportion of salicylaldehyde to p-hydroxybenzaldehyde in the product is about five to one, the same as for the conventional aqueous reaction.

Therefore, from what information appears in the literature, there would seem to be little advantage to be gained by using aqueous ethyl alcohol as a solvent in the preparation of salicylaldehyde by this method. There is nothing to incline a chemist to investigate other alcoholic solvents as the means by which improved results might be obtained.

Consequently, it is surprising and unexpected to find that aqueous methanol used as the solvent medium for the preparation of salicylaldehyde by the Reimer-Tiemann reaction provides both better combined yields of hydroxyaldehydes and sharply reduced tar formation as compared to the results obtained by using either water or aqueous ethyl alcohol as the reaction solvent. By using as the solvent aqueous methanol containing from about 10% to about 75% by weight of methanol, the yield of salicylaldehyde is at least as good as that obtained with water or aqueous ethyl alcohol and the yield of the valuable p-hydroxybenzaldehyde is considerably better. The reduced quantity of tar produced by this improved method not only reflects more efficient use of the reactants, but also is of great commercial value in simplifying the separation of reaction products of good quality and in reducing the quantity of waste materials for disposal.

More evident advantages for this new method include the lower boiling point of methanol and its inability to form an azeotrope with water as compared to ethanol. Methanol is thereby rendered more easily recovered for reuse in the process as well as being a more attractive solvent commercially.

The other conditions of this improved process are essentially those under which the Reimer-Tiemann is conventionally run. For example, the reaction temperature can be from about 25° C. up to about 70° C. and it is preferably about 50–60° C. The only commercially practical alkali is sodium hydroxide although other such bases are operable. The quantity of solvent used in relation to the amount of reactants is not critical to operability, but there are obvious practical limitations, particularly in commercial operation, to provide a reaction mixture which is not excessively viscous and hard to handle and yet which offers a maximum of product per volume of equipment. Additionally, many different mole ratios of reactants have been employed successfully in running the Reimer-Tiemann reaction. The use of excess phenol and alkali over the chloroform has been found to give good results, particularly a mole ratio of 2–4 moles of phenol and 3–8 moles of sodium hydroxide per mole of chloroform. However, ratios outside these ranges can be used.

The proportion of methanol in the aqueous solvent employed in this improved process is about 10–75% by weight. The use of aqueous solvent containing less than about 10% of methanol gives little or no advantage over the old process as carried out in water alone. When a solvent containing more than about 75% of methanol is employed in the reaction, conversions drop to an undesirably low level and the proportion of p-hydroxybenzaldehyde to salicylaldehyde in the product is reduced to about that obtained by the old process where water is the sole solvent. Such higher proportions of methanol in the reaction solvent also add to process problems, for example, larger reaction volumes are required per unit of product and methanol recovery becomes an increasingly disadvantageous factor. Preferably, the aqueous methanol solvent contains about 15–40° by weight of methanol, particularly for larger scale operation where it is desirable to use a liquid alkali such as aqueous sodium hydroxide of about 50–55% by weight concentration and to maintain the concentration of all the reactants in the reaction mixture as high as possible without encountering unduly high viscosity or precipitation of solids which would make for process difficulties.

Similarly, the order and manner in which the components of the reaction mixture are combined and the way in which the products are separated have been varied widely. The batchwise procedure outlined in the examples below has been found to give good results. According to this preferred batch procedure, chloroform is added portionwise, either as such or as its solution in methanol, to a stirred mixture of the other reaction components at the desired reaction temperature. After the reaction is substantially complete, the alkali is neutralized and the reaction mixture is preferably made slightly acidic by addition of a suitable acid such as sulfuric acid or hydrochloric acid. The hydroxyaldehyde products can then be separated from the resulting organic layer by conventional means, for example by distillation and extraction steps as shown below. Unreacted phenol can be recycled to the process along with recovered methanol. This process can be varied and modified in obvious ways to adapt it to various requirements, for example, to permit semi-continuous or continuous operation.

*Example 1*

A solution of 240 g. of sodium hydroxide and 282.3 g. of phenol in a solvent consisting of 240 g. of water and 60 g. of methanol was prepared in a reaction flask and its temperature was adjusted at 55° C. To the stirred solution there was added 119.5 g. of chloroform over a two hour period. The temperature of the reaction mixture was maintained at 55° C. during this period by moderate external cooling. After addition of the chloroform, stirring at 55° C. was continued for an additional 1.5 hours. The resulting reaction mixture was diluted by addition of about half its volume of process water and then was acidified to pH 5 with dilute sulfuric acid to form an oil layer and an aqueous layer. The oil layer was washer once with water and then was steam distilled, using the combined aqueous layers, after recovery of methanol therefrom, to supply the steam. The steam distillate oil layer consisted essentially of salicylaldehyde and unreacted phenol which were separated by fractional distillation. The organic residue from the steam distillation was extracted with aqueous sodium hydroxide. p-Hydroxybenzaldehyde was recovered from the extract; the extracted residue was a caustic-insoluble tar. The recovered products, based on the average of eight such preparations, were: 45.5 g. of salicylaldehyde, 21.1 g. of p-hydroxylbenzaldehyde, and 12.8 g. of insoluble tar. Based on the phenol disappearing in the process, an 83.9% yield of combined aldehydes was obtained (57.4% yield of salicylaldehyde plus 26.5% yield of p-hydroxybenzaldehyde).

*Example 2*

A series of eight runs was made as described in Example 1 using the same quantities of materials except that no methanol was used. The average yields obtained were: 51.3% of salicylaldehyde and 9.4% of p-hydroxybenaldehyde based on the phenol converted. An average of 32.2 g. of tar was obtained in each run.

*Example 3*

In the same way, a series of eight runs was made as in Example 1 except that an equal weight of ethyl alcohol was used in place of methanol. The average yields of products were: 55.0% of salicylaldehyde and 21.3% of p-hydroxybenzaldehyde, based on the phenol converted. An average of 16.7 g. of tar was obtained in each run. By replacing methanol with an equal weight of ethyl alcohol, the yield of combined aldehydes was reduced from 84% to 76% and the production of tar increased from 12.8 g. to 16.7 g. per run.

In the examples above and in those following, the weights of the individual products from each run varied ±1 g. or less from the average.

*Example 4*

By the procedure of Example 1, a solution of 240 g. of NaOH and 282.3 g. of phenol in a solvent consisting of 196 g. of water and 43 g. of methanol was reacted with 119.5 g. of chloroform. From a series of eight such runs, there was obtained a combined yield of 79.3% of hydroxybenzaldehydes based on the phenol converted. The ratio of salicylaldehyde to p-hydroxybenzaldehyde was similar to that shown in Example 1. An average of 16.0 g. of tar per run was obtained.

*Example 5*

By the procedure of Example 1, a solution of 240 g. of NaOH and 282.3 g. of phenol in a solvent consisting of 240 g. of water and 43 g. of methanol was reacted with 119.5 g. of chloroform. From a series of seven such runs, there was obtained a combined yield of 80.4% of hydroxybenzaldehydes based on the phenol converted. The ratio of salicylaldehyde to p-hydroxybenzaldehyde was similar to that shown in Example 1. An average of 15.5 g. of tar per run was obtained.

*Example 6*

By the procedure of Example 1, a solution of 240 g. of NaOH and 282.3 g. of phenol in a solvent consisting of 240 g. of water and 120 g. of methanol was reacted with 119.5 g. of chloroform. From a series of four such runs, there was obtained a combined yield of 83.8% of hydroxybenzaldehydes based on the phenol converted. The ratio of salicylaldehyde to p-hydroxybenzaldehyde was similar to that shown in Example 1. An average of 8.8 g. of tar per run was obtained.

Results similar to those shown in Example 1 and 4–6 are obtained when other proportions of methanol are used in the reaction solvent within the limits defined above or when known variations of the Reimer-Tiemann reaction procedure as previously explained are employed.

I claim:

1. In the preparation of salicylaldehyde and p-hydroxybenzaldehyde by the reaction wherein phenol, chloroform, and an alkali metal hydroxide are reacted in a solvent medium at about 25–70° C. the improvement wherein the solvent medium consists essentially of aqueous methanol containing about 10% to about 75% by weight of methanol.

2. The process of claim 1 wherein the solvent medium is aqueous methanol containing 15–40% by weight of methanol, the remainder being water.

3. A process for making salicylaldehyde and p-hydroxybenzaldehyde which comprises reacting by contacting 2–4 moles of phenol, 3–8 moles of sodium hydroxide, and 1 mole of chloroform at about 25–70° C. in aqueous methanol containing about 10–75% by weight of methanol and separating salicylaldehyde and p-hydroxybenzaldehyde from the reaction mixture thereby produced.

4. The process of claim 1 wherein the alkali metal is sodium.

5. The process of claim 4 wherein 2–4 moles of phenol and 3–8 moles of sodium hydroxide are reacted with a mole of chloroform.

References Cited

FOREIGN PATENTS 80,195   2/1895   Germany.

OTHER REFERENCES

Sen et al.: Chem. Abstracts, vol. 26 (1932), page 5551.
Vogel: Practical Organic Chemistry, 3rd ed., (1962), pp. 703–4.
Wynberg: Chemical Reviews, vol. 60, (1960), pp. 171, 183 and 184.

BERNARD HELFIN, *Primary Examiner.*

LEON ZITVER, *Examiner.*